US012090524B2

(12) United States Patent
Veiga Damasceno Junior

(10) Patent No.: US 12,090,524 B2
(45) Date of Patent: Sep. 17, 2024

(54) DEVICE FOR CLEANING AND POLISHING CONNECTIONS OF UNDERWATER EQUIPMENT COMPRISING A CLEANING-FLUID DISPERSING MECHANISM

(71) Applicant: PETROLEO BRASILEIRO S.A.—PETROBRAS, Rio de Janiero (BR)

(72) Inventor: Carlos Americo Veiga Damasceno Junior, Macae (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 989 days.

(21) Appl. No.: 17/051,264

(22) PCT Filed: Apr. 29, 2019

(86) PCT No.: PCT/BR2019/050155
§ 371 (c)(1),
(2) Date: Jun. 21, 2021

(87) PCT Pub. No.: WO2019/210382
PCT Pub. Date: Nov. 7, 2019

(65) Prior Publication Data

US 2021/0316337 A1 Oct. 14, 2021

(30) Foreign Application Priority Data

May 3, 2018 (BR) ....................... 10 2018 008956.0

(51) Int. Cl.
*B08B 1/32* (2024.01)
*A46B 11/06* (2006.01)
(Continued)

(52) U.S. Cl.
CPC .............. *B08B 1/32* (2024.01); *A46B 11/063* (2013.01); *A46B 13/001* (2013.01);
(Continued)

(58) Field of Classification Search
CPC ..... A46B 13/001; A46B 13/02; A46B 13/008; A46B 2200/30; A46B 2200/3086;
(Continued)

(56) References Cited

U.S. PATENT DOCUMENTS 5,964,003 A * 10/1999 Rogers .................... A47L 13/26
15/52

FOREIGN PATENT DOCUMENTS

CA 2378489 A1 2/2001
CN 202244019 U 5/2012
(Continued)

OTHER PUBLICATIONS

FR-2556618-A1 translation (Year: 1984).*

*Primary Examiner* — Abbie E Quann
(74) *Attorney, Agent, or Firm* — RAPHAEL BELLUM PLLC

(57) ABSTRACT

The present invention relates to a device for cleaning and polishing connections of underwater equipment, comprising: a connection element (3) adapted to be connected to a torque-generating device; a cleaning-fluid-discharge device (2) comprising at least one cleaning-fluid reservoir (20); and a cleaning element connected to the discharge device via a support (4) for the cleaning element, wherein the support (4) for the cleaning element comprises at least one channel (41) that in a fluidic manner connects the at least one cleaning-fluid reservoir (20) to the cleaning element. In addition, the device comprises a control system (1) for dispersal of cleaning fluid, comprising a telescopic shaft (1) that comprises a fixed part (11) and a movable part (12), which are
(Continued)

adapted to move longitudinally relative to one another, wherein: the movable part (12) extends at least partially inside the fixed part (11); the fixed part (11) is secured to the fluid-discharge device (2); and the movable part (12) is secured to the cleaning element (42); a compressible damping element (10) is provided between the fixed part and the movable part (12); an upper portion of the movable part (12) extends partially inside the fluid-discharge device (2), via an opening (21) in the fluid-discharge device (2); and the channel (41) that fluidly connects the at least one cleaning-fluid reservoir (20) to the cleaning element (42) extends longitudinally through the movable part (12) and extends partially through the upper portion of the movable part (12).

15 Claims, 5 Drawing Sheets

(51) Int. Cl.

| | |
|---|---|
| ***A46B 13/00*** | (2006.01) |
| ***A46B 13/02*** | (2006.01) |
| ***B08B 1/12*** | (2024.01) |
| ***B24B 23/02*** | (2006.01) |

(52) U.S. Cl.
CPC ............ *A46B 13/008* (2013.01); *A46B 13/02* (2013.01); *B08B 1/12* (2024.01); *B24B 23/02* (2013.01); *A46B 2200/3073* (2013.01); *A46B 2200/3086* (2013.01)

(58) Field of Classification Search
CPC .... A46B 2200/3093; A46B 2200/3073; A46B 11/063; B24B 23/02; B08B 1/32; B08B 1/12
USPC ................................................ 15/24, 29, 1.7
See application file for complete search history.

(56) References Cited

FOREIGN PATENT DOCUMENTS

| | | | | |
|---|---|---|---|---|
| CN | 204825855 | U | | 12/2015 |
| FR | 2556618 | A1 | * | 12/1984 |
| GB | 2135571 | A | | 9/1984 |
| KR | 20150053442 | A | | 5/2015 |
| WO | 9501905 | A1 | | 1/1995 |
| WO | 2016033678 | A1 | | 3/2016 |

* cited by examiner

DEVICE FOR CLEANING AND POLISHING CONNECTIONS OF UNDERWATER EQUIPMENT COMPRISING A CLEANING-FLUID DISPERSING MECHANISM

FIELD OF THE INVENTION

The present invention relates to tools for cleaning and polishing connections of underwater equipment. More specifically, the present invention relates to tools for cleaning and polishing connections of underwater equipment with electro-hydraulic cables.

BACKGROUND OF THE INVENTION

The current state of the art provides a series of tools for cleaning and polishing connections of underwater equipment, with the use of cleaning fluids. However, the current cleaning devices used, known as rotating bristle brushes, are inefficient and require a great deal of time using important resources, creating high operating cost, especially due to the fact that the cleaning fluid is not effectively discharged during use.

In addition, when those devices are operated in ocean environments, the difficulty of operation may cause shocks to the tool, which represents a serious risk of accident to the operator and breakage of the tool.

None of these problems is addressed by the state of the art, as is clear from the known examples the state of the art of tools of that type, which will be described below.

Document U.S. Pat. No. 7,543,354 B2 is in regard to a surface-cleaning rotating brush head, in which a channel for passage of a cleaning liquid in the rotation shaft of the brush head is defined.

The purpose in U.S. Pat. No. 7,543,354 B2 is to clean the surface of closed recipients (vessel), therefore it is proposed that a cleaning fluid be inserted externally on the vessel and collected by the channel through which the liquid passes. The entry from the return of the passage channel is positioned in the central area of a lower cleaning element.

The cleaning fluid is stored in a reservoir right above the cleaning brush and it flows through lateral channels to the vessel to be cleaned, sucking the fluid through the passage channel.

Thus, document U.S. Pat. No. 7,543,354 B2 shows a rotational brush for cleaning surfaces that comprises a central channel for the circulation of a cleaning fluid and a cleaning fluid storage tank positioned above the cleaning element of the brush.

However, document U.S. Pat. No. 7,543,354 B2 does not make any reference to controlling the flow of the cleaning fluid so that its insertion only during use of the tool is controlled, in which there is also a way of damping shocks due to vibration of the tool.

Document U.S. Pat. No. 3,943,591 A is in regard to a rotating cleaning brush that comprises a rotating cleaning element, in the form of a brush, a cleaning fluid reservoir, and a central channel for release of cleaning fluid, in which the channel extends inside the rotation axis of the cleaning element.

According to the configuration described in that document, the cleaning liquid is pumped through a central channel with the use of an electric pump.

Thus, that document (U.S. Pat. No. 3,943,591 A) reveals a rotating brush for cleaning surfaces that comprises a cleaning element in the form of a rotating brush and the injection of a cleaning liquid in the central region of the rotating brush, in which the cleaning liquid is stored in a tank positioned on the upper part of the cleaning element.

However, document U.S. Pat. No. 3,943,591 A does not make any reference to controlling the flow of the cleaning liquid so that it is inserted in a controlled manner only during use of the tool, in which there is also a way of damping shocks from vibration of the tool.

Document U.S. Pat. No. 8,047,736 B2 is in regard to a floor washer that comprises a rotating brush, and a cleaning liquid dispenser mounted on the brush assembly, in which the cleaning liquid is stored in a reservoir.

U.S. Pat. No. 8,047,736 B2 also describes that the brush (cleaning element) is connected to the principal element by means of screws, such that both elements comprise a channel for the passage of cleaning fluid.

Thus, U.S. Pat. No. 8,047,736 B2 reveals a configuration in which the device is divided into two parts, a cleaning element and a principal element that comprises, among other elements, a cleaning liquid reservoir.

Thus, U.S. Pat. No. 8,047,736 B2 reveals a rotating brush for cleaning surfaces that comprises a cleaning element in the form of a rotating brush and the injection of a cleaning liquid in the central region of the rotating brush, in which the cleaning liquid is stored in a tank positioned on the upper part of the cleaning element. That document also shows that the cleaning element is connected to the principal element of the device by means of screws.

However, document U.S. Pat. No. 8,047,736 B2 does not make any reference to controlling the flow of the cleaning fluid so that it is inserted in a controlled manner only during use of the tool, in which there is also a way to dampen the shocks due to vibration of the tool.

As will be detailed further below, the present invention seeks to resolve problems in the state of the art described above in a practical and efficient manner.

SUMMARY OF THE INVENTION

The purpose of the present invention is to provide a device for cleaning and polishing connections of underwater equipment with electro-hydraulic cables, which comprises a mechanism for dispersal of cleaning fluid that ensures dispersal of fluid only when the device is in use.

In order to attain the objectives described above, the present invention provides a device for cleaning and polishing connections of underwater equipment, comprising: a connection element adapted so it can be connected to a torque-generating device; a device to discharge cleaning fluid comprising at least one reservoir of cleaning fluid; and a cleaning element connected to the discharge device through a support for the cleaning element, in which the support for the cleaning element comprises at least one channel that fluidly connects the at least one reservoir of cleaning fluid to the cleaning element. In addition, the device comprises a system for controlling dispersal of cleaning fluid comprising a telescopic shaft that has a fixed part and a movable part, adapted to be moved longitudinally in relation to each other, in which: the movable part extends at least partially inside the fixed part; the fixed part is secured to the fluid discharge device, and the movable part is secured to the cleaning element; between the fixed part and the movable part, a compressible damping element is provided; an upper portion of the movable part is partially extended inside of the fluid discharge device, via an opening in the fluid discharge device; and the channel that fluidly connects the at least one reservoir of cleaning fluid to the cleaning element extends longitudinally into the movable part, and it extends partially through the upper portion of the movable part.

BRIEF DESCRIPTION OF THE FIGURES

The detailed description presented below references the attached figures and their respective reference numbers.

DETAILED DESCRIPTION OF THE INVENTION

First, it is noted that the following description stems from a preferential realization of the invention. As will be evident to any technician in the matter, however, the invention is not limited to that particular realization.

The present invention refers to a device that serves as a tool to perform the cleaning and polishing of connections of underwater equipment with electro-hydraulic cables. As will be evident with the following description, the proposal seeks to eliminate, or optimize, use of the rotating brush with traditional bristles, to increase the efficiency of the cleaning procedure, and to reduce the operating time.

The current systems are inefficient in removing incrustations and rust. The long operating time consumes resources of the other equipment involved in the operation, such as: the remote operating vehicle, ship and hoist. The risk of accident increases due to the greater physical strain on the operator created by the long operational run time.

Figure 1A:
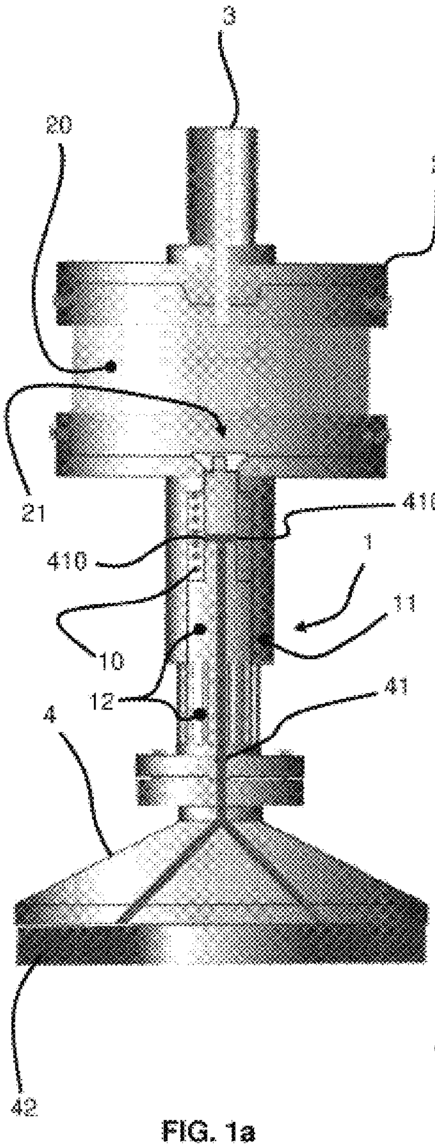
FIG. 1*a* shows a first optional configuration of the device for cleaning and polishing connections of underwater equipment.
Figure 1B:
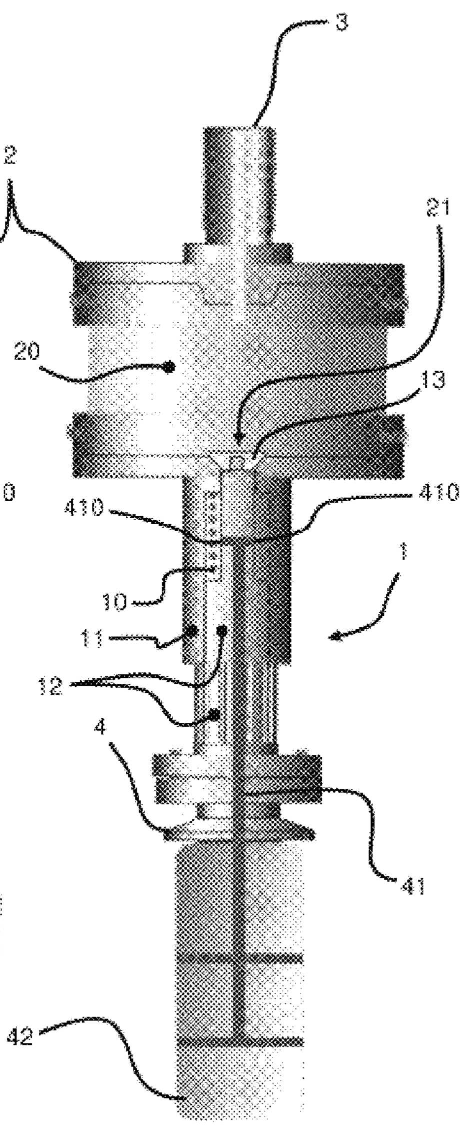
FIG. 1*b* shows a second optional configuration of the device for cleaning and polishing connections of underwater equipment.

Thus, as shown in FIGS. 1*a* and 1*b*, the invention provides a device for cleaning and polishing connections of underwater equipment, comprising: a connection element 3 adapted to be connected to a torque-generating device; a cleaning fluid discharge device 2 comprising at least one reservoir 20 of cleaning fluid; and a cleaning element 42 connected to the discharge device through a support 4 to the cleaning element 42, in which the support 4 for the cleaning element 42 comprises at least one channel 41 that fluidly connects the at least one reservoir 20 of cleaning fluid to the cleaning element 42.

As can be seen, the device for cleaning and polishing connections of undersea equipment also comprises a cleaning fluid dispersal control system comprising one telescopic shaft 1 that has a fixed part 11 and a movable part 12, adapted to be moved longitudinally in relation to each other.

In this configuration, the movable part 12 extends at least partially inside the fixed part 11, so that the fixed part 11 is secured to the fluid discharge device 2, and the movable part 12 is secured to the cleaning element 42. Between the fixed part 11 and the movable part 12, a compressible damping element 10 is provided.

Thus, when the tool is in use and there are vibrations, the movable part 12 is moved to the interior of the fixed part 11 and repelled by the damping element 10, which will tend to return to its natural state (not compressed). To that end, the optionally compressible damping element 10 used may be a spring, a compressible fluid, or any other known element that serves that purpose.

It is also seen that an upper portion of the movable part 12 extends partially inside the fluid discharge device 2, through an opening 21 of the fluid discharge device 2.

In this configuration, the channel 41 that fluidly connects the at least one reservoir 20 of cleaning fluid to the cleaning element 42 extends longitudinally through the movable part 12, and extends partially through the upper portion of the movable part 12. Thus, fluid from the reservoir 20 is directed to the cleaning element 42, which helps in the removal of dirt and incrustations, for example.

Optionally, the channel 41 comprises at least one lateral opening 410 (optionally two lateral openings 410) in an intermediate area of the upper portion of the movable part 12 of the telescopic shaft 1.

Optionally, the movable part 12 comprises a reduction in its cross-sectional dimensions in its upper portion, as shown in FIGS. 1*a* and 1*b*. Thus, a space is created to accommodate the damping element 10 between the movable part 12 and the fixed part 11 of the telescopic shaft 1. In addition, a limit is determined so that the movable part 12 moves inside the fixed part 11.

Optionally, on the upper extremity of the movable part 12 of the telescopic shaft 1, a stopper 13 is provided to prevent the movable part 12 from coming completely out of the interior of the reservoir 20 of cleaning fluid. That stopper 13 may be secured in its location of use by any known means, such as a weld, glue, or screw, among others.

It is important to point out that the opening 21 of the fluid discharge device 2 is used to move the cleaning fluid out towards the cleaning element 42, as will be explained in more detail further below in this report. Thus, with the optional adoption of the stopper 13, better closure of the opening 21 in the reservoir 20 is also assured when the damping element 10 is in its extended position, in which the flow of cleaning fluid is not desired.

It can also be seen that FIGS. 1*a* and 1*b* show slightly different optional configurations of the invention, however, their essential elements are the same. The cleaning element 42 in FIG. 1*a* is disc type, which allows it to be used for cleaning and polishing flat surfaces. Since the cleaning element 42 in FIG. 1*b* is cylindrical, this allows it to be used to clean and polish concave surfaces, for example.

As described above, the connection element 3 is adapted to be connected to a torque-generating device, in order to turn the entire device, preferably at high rotations, cleaning the desired surface using the cleaning element 42. The connecting element 3 and the torque-generating device may be connected using screws, bolts, or any other means of attachment. If the attachment is realized using screws, a screw inverse to the rotation may be used in the upper part of the connection element 3.

Figure 2A:
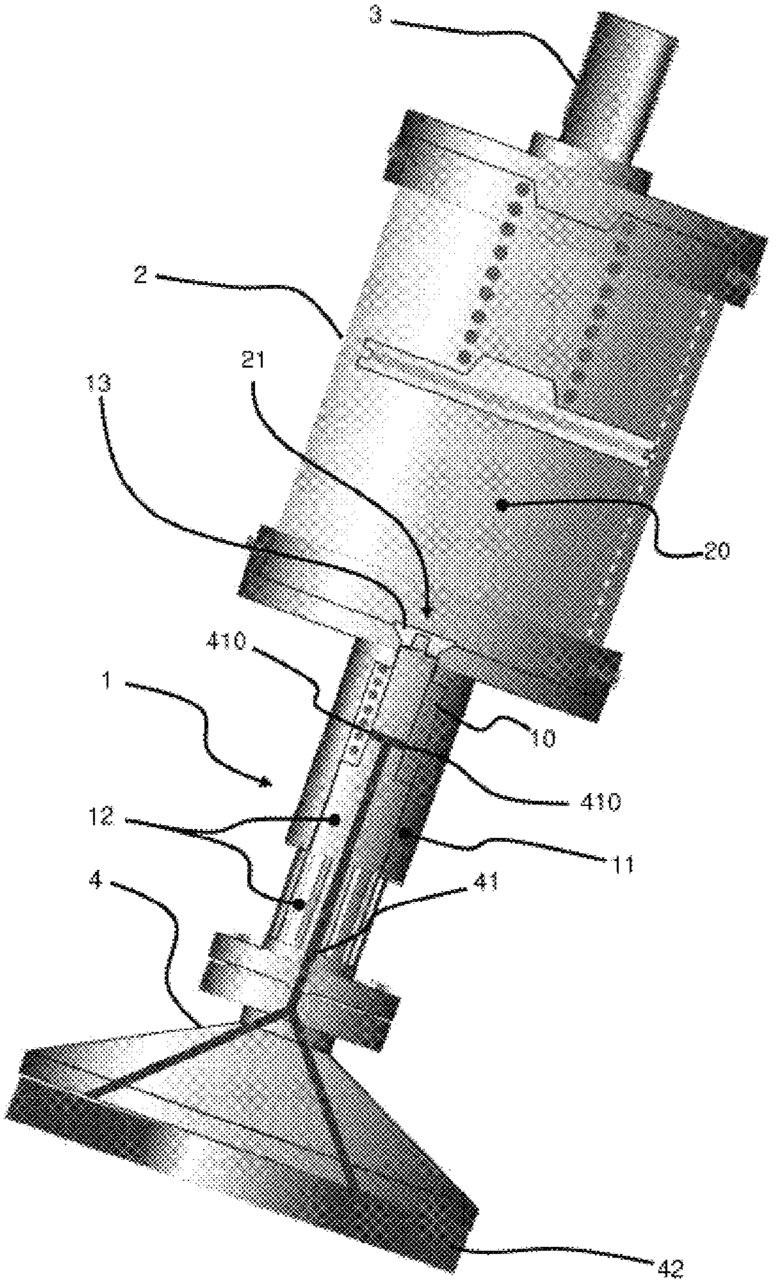
FIG. 2*a* shows a third optional configuration of the device for cleaning and polishing connections of underwater equipment.
Figure 2B:
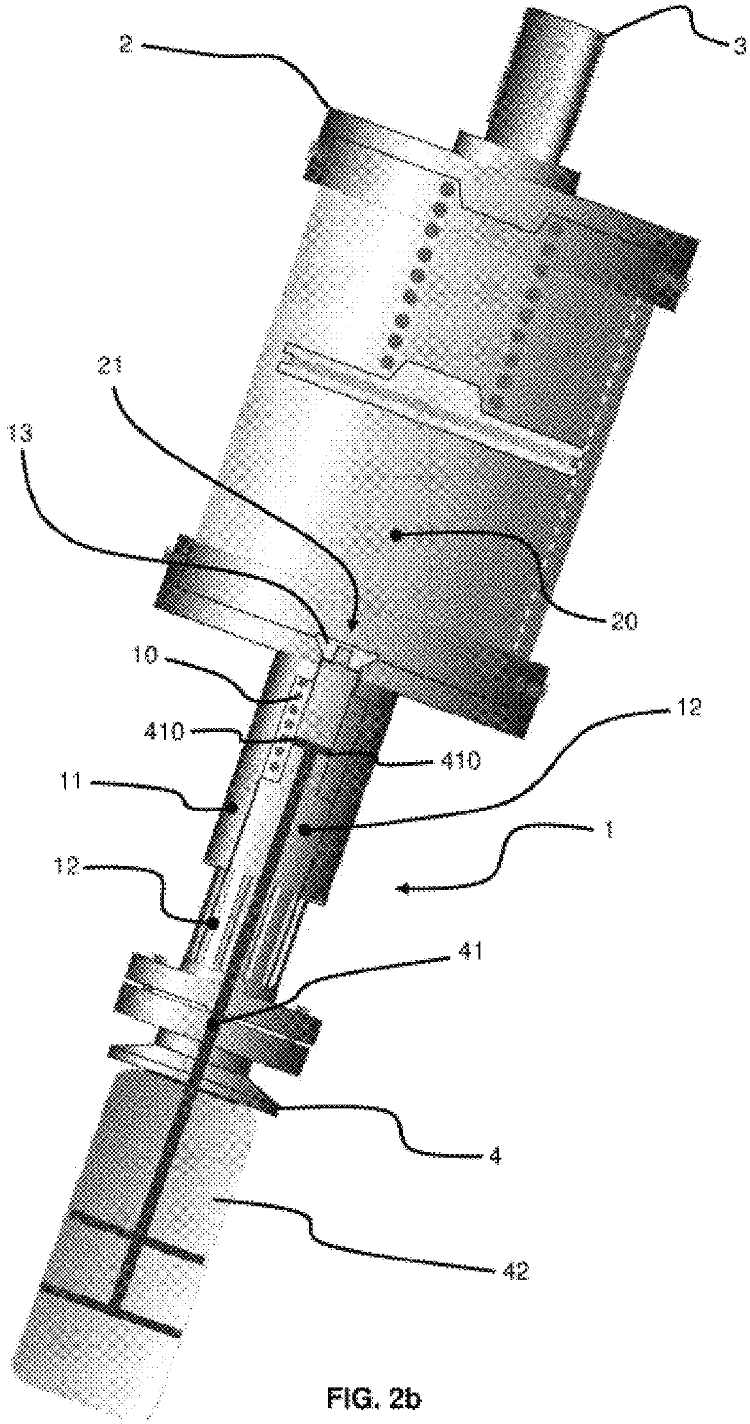
FIG. 2*b* shows a fourth optional configuration of the device for cleaning and polishing connections of underwater equipment.

FIGS. 2*a* and 2*b* show alternative configurations of the invention. As seen, the configuration shown is very similar to the configuration shown in FIGS. 1*a* and 1*b*, however, in the configuration in FIGS. 2*a* and 2*b*, the device for cleaning and polishing connections of underwater equipment optionally comprises a system to pressurize the cleaning fluid.

Although the illustrated system is comprised of a plunger/spring set, any form of pressurization of the cleaning fluid may be used, such as use of pressurized gases, or any other known form.

Figure 3A:
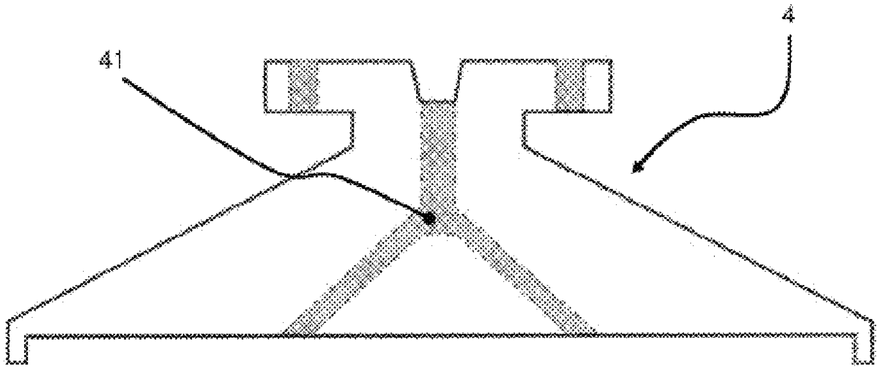
FIG. 3*a* shows a cross-sectional view of support configurations for the cleaning element, as shown in FIGS. 1*a* and 2*a*.
Figure 3B:
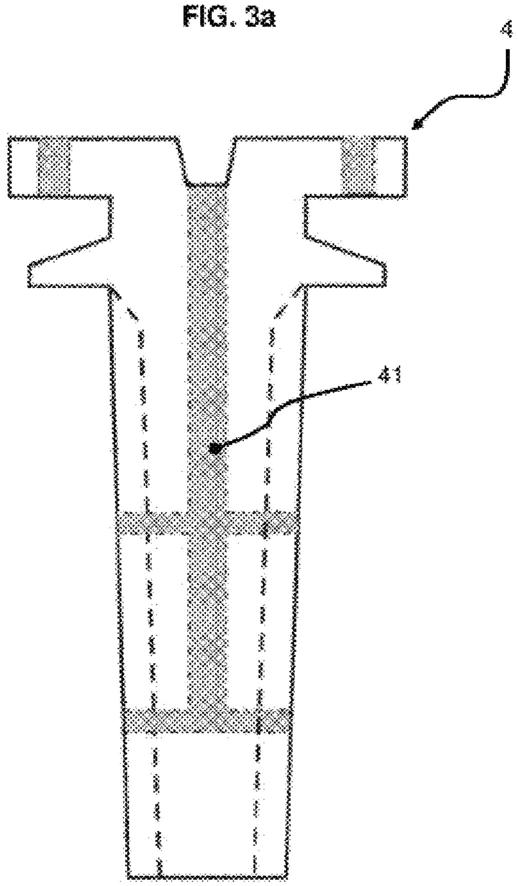
FIG. 3*b* shows a cross-sectional view of support configurations for the cleaning element, as shown in FIGS. 1*b* and 2*b*.

FIGS. 3*a* and 3*b* show cross-sectional views of support configurations 4 for the cleaning element 42, relative, respectively, to the configurations illustrated in FIGS. 1*a* and 1*b*. These figures more clearly show that the support 4 for the cleaning element 42 comprises at least one channel 41 that connects the at least one reservoir 20 of cleaning fluid to the cleaning element 42. Thus, fluid from the reservoir 20 is directed to the cleaning element 42, which aids in the removal of dirt and incrustations, for example.

Optionally, the at least one channel 41 of the support 4 to the cleaning element is branched in order to discharge fluid at different points of the cleaning element 42, which enables more homogeneous cleaning.

Figure 4:
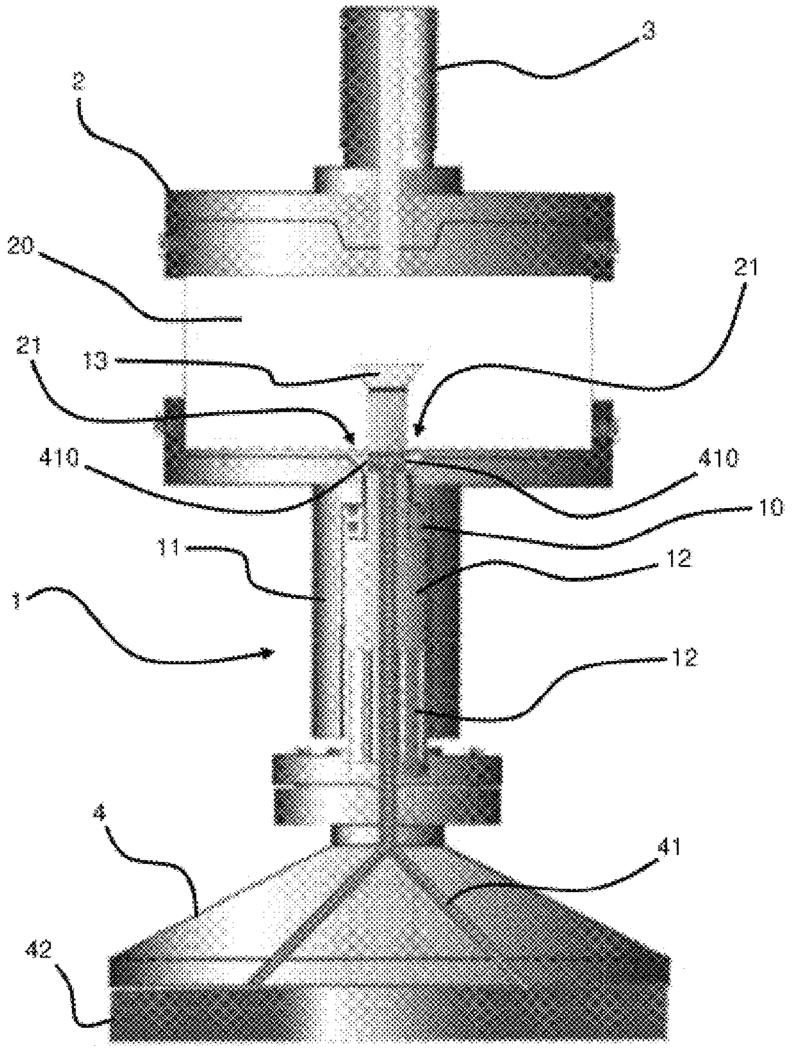
FIG. 4 shows a configuration of the device for cleaning and polishing connections of underwater equipment shown in FIG. 1*a*, in which the telescopic shaft 1 is in its compressed position.

FIG. 4 shows the configuration of the device for cleaning and polishing connections of underwater equipment illustrated in FIG. 1*a*, in which the telescopic shaft 1 is in its compressed position. In that position, the movable part 12 of the telescopic shaft 1 is pressed inside the external part, such that the upper end of its internal portion is inserted into the reservoir 20. In that position, the damping element 10 is pressed between the movable part 12 and the fixed part 11 of the telescopic shaft 1.

It is seen that in this position, the opening 410 of the channel 41 is also moved to inside the reservoir 20, making it possible for the cleaning fluid to flow through the channel 41 to the cleaning element 42.

Now in the extended position of the telescopic shaft 1, illustrated in FIG. 1*a*, it is seen that the opening 410 of the channel 41 is obstructed (or it is not in contact with the cleaning fluid), which prevents the cleaning fluid from running through the channel 41.

Thus, to use the tool, the telescopic shaft 1 is initially in its extended position (FIGS. 1*a*, 1*b*, 2*a*, 2*b*) such that cleaning fluid cannot be run through the channel 41. Thus, the user must press the tool against the surface to be cleaned, pressing the telescopic shaft 1 to its compressed position (FIG. 4), and releasing the entry of the channel 41, allowing the cleaning fluid to run to the cleaning element 42.

Optionally, the fixed part 11 of the telescopic shaft 1 comprises an opening of the same diameter as the opening 21 of the reservoir 20, in which the upper portion of the movable part 12 comprises a diameter slightly smaller than the diameter of the openings. Thus, even if the tool is pressed against the cleaning surface with slight force, the fluid does not run between the fixed part 11 and the movable part 12 of the telescopic shaft 1, allowing the operator to have more control over the need to release cleaning fluid to the cleaning element 42.

Therefore, the device of the invention has a telescopic shaft system 1 with a spring, located between the cleaning element 42 and the reservoir 20 of fluid that allows small movements to be absorbed and offset, as well as a large part of the vibration caused by the friction of the sponge with the surface to be cleaned, in addition to allowing precise control of release of the cleaning fluid to the cleaning element 42.

Optionally, the cleaning element 42 comprises a cleaning surface of an abrasive synthetic sponge type and it has different diameters. However, it must be understood that other types of cleaning surfaces may be used, manufactured using different materials and with different formats.

Similarly, the cleaning element 42 may be replaced, so that after it is worn out, it may be changed quickly, keeping the other original parts of the device.

As known by any technician in the matter, the cleaning fluid used may be any fluid known in the state of the art, including, but not limited to, detergent fluids, abrasive pastes, or various chemical reagnets to help remove incrustations and rust.

Thus, it is clear that the invention described herein resolves, in an unexpected way, the problems in the state of the art, for which it is proposed, to wit, to provide a device for cleaning and polishing connections of underwater equipment with electro-hydraulic cables, which comprises a system for damping and control of cleaning fluid that prevents its waste.

The invention claimed is:

1. A device for cleaning and polishing connections of underwater equipment, the device comprising:

a connection element configured to connect to a torque-generating device;

a cleaning fluid discharge device comprising at least one reservoir of cleaning fluid; and a cleaning element connected to the discharge device through a support to the cleaning element, wherein the support to the cleaning element comprises at least one channel that fluidly connects the at least one reservoir of cleaning fluid to the cleaning element, wherein the discharge device comprises a system to control dispersal of the cleaning fluid, wherein the system comprises a telescopic shaft with a fixed part and a movable part, that move longitudinally in relation to each other, wherein the movable part extends at least partially to an interior of the fixed part, wherein the fixed part is secured to the fluid discharge device, and the movable part is secured to the cleaning element, wherein a compressible damping element is provided between the fixed part and the movable part, wherein an upper portion of the movable part extends partially to an interior of the discharge device, through an opening in the discharge device, and wherein the channel that fluidly connects the at least one reservoir of cleaning fluid to the cleaning element extends longitudinally along the movable part, and the channel extends partially through the upper portion of the movable part.

2. The device of claim 1, wherein the-connection element is selected from a group consisting of a screw and bolts.

3. The device of claim 1, wherein the cleaning element has a disc shape.

4. The device of claim 1, wherein the cleaning element has a cylindrical shape.

5. The device of claim 1, wherein the channel connecting the reservoir to the cleaning element contains branches that are directed to different points of the cleaning element.

6. The device of claim 1, wherein the compressible damping element is selected from a group consisting of: a spring and a compressible fluid.

7. The device of claim 1, wherein the channel comprises at least one lateral opening in an intermediate region of the upper portion of the movable part of the telescopic shaft.

8. The device of claim 1, wherein the movable part comprises a reduction in cross-sectional dimensions in the upper portion.

9. The device of claim 1, wherein the movable part of the telescopic shaft comprises a stopper proximate to the reservoir.

10. The device of claim 2, wherein the cleaning element is a disc type cleaning element.

11. The device of claim 2, wherein the cleaning element has a cylindrical shape.

12. The device of claim 1, wherein the connection element is adjacent to the cleaning fluid discharge device.

13. The device of claim 1, wherein the telescopic shaft is adjacent to both the cleaning fluid discharge device and the cleaning element.

14. The device of claim 1, wherein the telescopic shaft is coupled to a lower surface of the at least one reservoir of cleaning fluid.

15. The device of claim 1, wherein the movable part of the telescopic shaft extends at least partially inside the fixed part such that the fixed part and the movable part are configured to move longitudinally in relation to each other.

* * * * *